United States Patent [19]

Markham et al.

[11] Patent Number: 5,733,412
[45] Date of Patent: Mar. 31, 1998

[54] DECOLORIZING BROWN FIBERS IN RECYCLED PULP

[75] Inventors: Larry D. Markham, Mobile, Ala.; Linda A. Beltz, Florida, N.Y.

[73] Assignee: International Paper Company, Purchase, N.Y.

[21] Appl. No.: 527,642

[22] Filed: Sep. 13, 1995

[51] Int. Cl.$^6$ ............................................. D21C 5/02
[52] U.S. Cl. .................. 162/6; 162/7; 162/4; 162/55; 162/23
[58] Field of Search .......................... 162/4, 5, 6, 7, 162/8, 57, 65, 20, 22, 23, 24, 25, 26, 55

[56] References Cited

U.S. PATENT DOCUMENTS

| | | | |
|---|---|---|---|
| 4,431,482 | 2/1984 | Heinbockel et al. | 162/243 |
| 4,435,249 | 3/1984 | Marham et al. | 162/24 |
| 4,612,088 | 9/1986 | Nardi | 162/235 |
| 5,073,301 | 12/1991 | Suess et al. | 252/402 |
| 5,129,987 | 7/1992 | Joachimides et al. | 162/25 |
| 5,176,793 | 1/1993 | Kurtz | 162/4 |
| 5,211,809 | 5/1993 | Naddeo et al. | 162/6 |
| 5,234,544 | 8/1993 | Naddeo | 162/5 |
| 5,249,716 | 10/1993 | Haché et al. | 162/7 |
| 5,266,158 | 11/1993 | Hill et al. | 162/7 |
| 5,298,118 | 3/1994 | Devic | 162/26 |
| 5,324,390 | 6/1994 | Naddeo et al. | 162/6 |
| 5,332,471 | 7/1994 | Naddeo et al. | 162/6 |
| 5,338,402 | 8/1994 | Devic et al. | 162/24 |
| 5,378,321 | 1/1995 | Delcourt | 162/57 |
| 5,451,296 | 9/1995 | Pikulin et al. | 162/241 |
| 5,464,501 | 11/1995 | Kogan et al. | 162/6 |

OTHER PUBLICATIONS

Naddeo et al., "Oxidative methods offer alternative to chlorine bleaching wastepaper", Pulp and Paper, v66, n11, p. 71(7), Nov. 1992.

Michael I. Berger et al. of Degussa Corporation, "Advanced Bleaching Technology for Secondary Fibers", pp. 4–7–0 to 4–7–11 with Tables I & II and Figures 1–20, 1990.

Wolfgang H. Matzke et al. of Research and Development Center, "Various Approaches for Understanding and Improving Secondary Fiber Brightness", pp. 698–706, 1990.

Tappi Press, Tappi Proceedings, "1990 Pulping Conference Book 2", cover page and pages 507–515, 1990.

*Primary Examiner*—Donald E. Czaja
*Assistant Examiner*—Jose S. Fortuna
*Attorney, Agent, or Firm*—Darby & Darby

[57] ABSTRACT

The invention relates to a method for decolorizing paper pulp containing colored fibers. The paper is first pulped and subjected to fine screening. The screened pulp is then dispersed at a temperature in excess of 100° C. and a pressure exceeding one atmosphere absolute pressure. Prior to the dispersing step a first agent (a reducing agent or oxidizing agent) is introduced to the pulp. A second agent is introduced to said pulp after introduction of the first agent. The second agent is an oxidizing agent when the first agent is a reducing agent, and a reducing agent when the first agent is an oxidizing agent. Finally, the dispersed pulp is recovered after the colored fibers are decolorized.

27 Claims, 1 Drawing Sheet

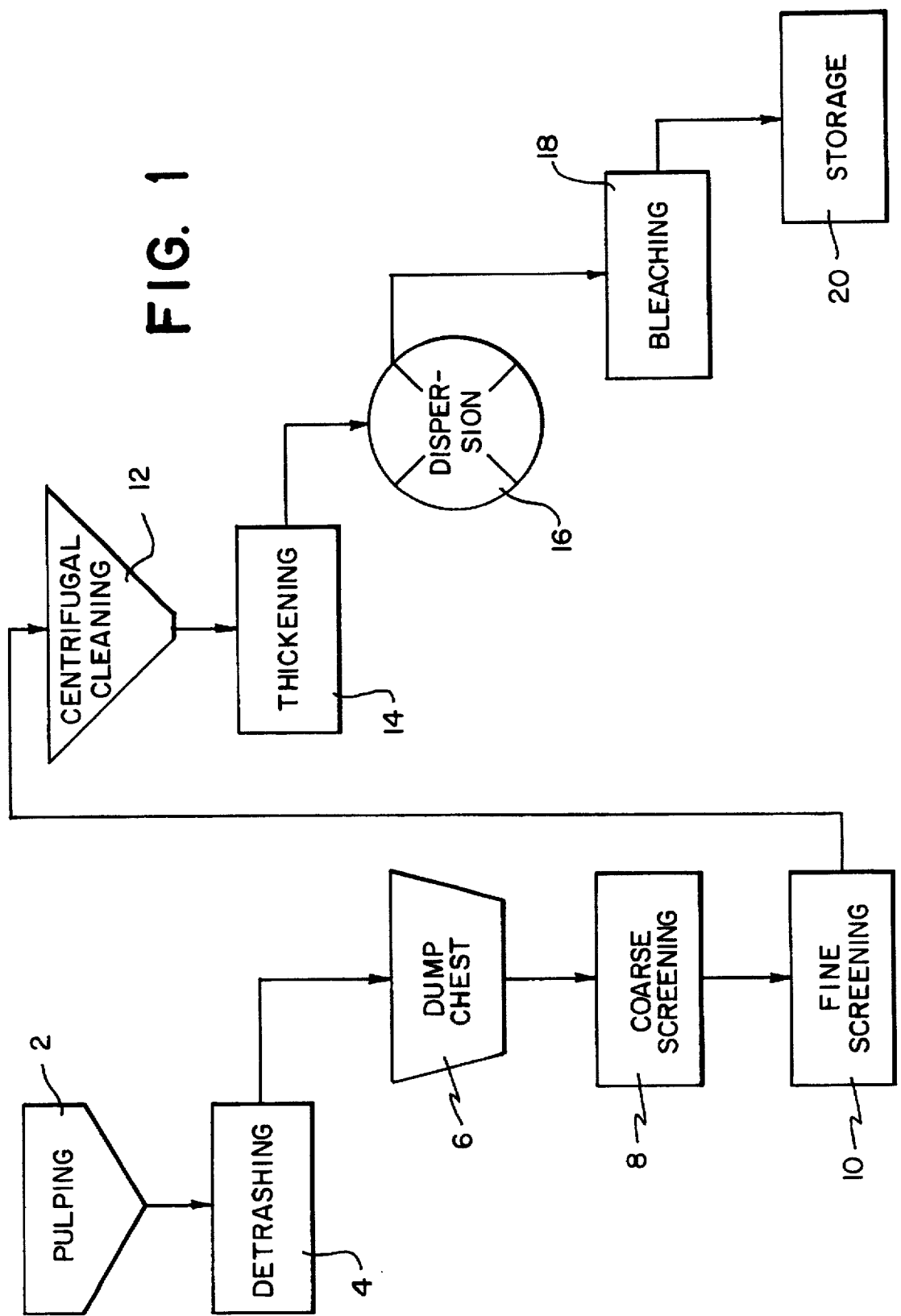

DECOLORIZING BROWN FIBERS IN RECYCLED PULP

FIELD OF THE INVENTION

The present invention relates to the preparation of paper pulp from recycled waste paper. More particularly, the present invention is directed to the decolorization of contaminating brown fibers in recycled paper pulp.

BACKGROUND OF THE INVENTION

Paper pulp obtained from recycled paper is a valuable raw material in the paper industry. The manufacture of certain grades of paper, such as tissue and toweling grades, is fairly tolerant of contaminants. In contrast, for production of "printing and writing grade" paper from recycled pulp, it is desirable that the pulp have a high degree of brightness, a homogeneous appearance and include minimal contamination by undesirable fibers, inks, adhesives, dirt and other contaminants. Accordingly, it is preferred that the waste stream used to prepare printing and writing grade recycled pulp include exclusively clean office waste paper.

In practice, it is impossible to ensure the homogeneity and cleanliness of the waste stream. Accordingly, recycling plants include elaborate processing steps for removing contaminants from the waste stream during preparation of the recycled pulp. Non-paper contaminants such as plastics and metal are removed mechanically during the repulping process. Inks, toner particles from photocopiers and laser printers, adhesive-based "stickies" and polymeric coatings are removed from the paper after repulping using various deinking, screening, cleaning and other separation processes.

However, existing processes are unable to remove brown lignin-containing fibers present in non-bleached paper and paperboard products, such as unbleached kraft envelopes, unbleached file folders, and corrugated boxes. In the case of office waste paper, for example, it is common for bales of office waste including clean office grade paper, to be intermixed with these grades of paper. When such grades of papers are repulped in a recycling plant together with office grade paper, the resultant brown fiber-containing pulp is less valuable than pulp made without such brown fibers. For example, writing paper made from pulp containing as little as 0.1% (by weight) brown fiber will include readily visible brown fibers in the paper. In fact, even a single brown fiber in a sheet of paper will be easily observable.

Accordingly, in the production of recycled printing and writing grade paper pulp from waste paper, steps must be taken to remove papers containing brown fibers prior to repulping. Such removal is typically done in an expensive manual sorting operation. It would be highly desirable to provide a process for making printing and writing paper grade recycled pulp which does not require a separate sorting step to remove paper sources containing brown fibers.

Rather than removing the brown fibers from the waste paper, one solution to the problem is to decolorize the brown fibers so they are not visible in the finished paper. One method of decolorizing brown fiber requires the use of a bleaching sequence similar to that conventionally used to bleach unbleached kraft and sulfite pulps. Such methods typically require three to five bleaching stages to satisfactorily decolorize brown fibers. Kraft fibers are particularly difficult to bleach because the lignin is modified by the kraft pulping chemicals. Some of the bleaching chemicals commonly used are oxygen, chlorine, sodium hydroxide, chlorine dioxide, sodium hypochlorite, hydrogen peroxide, and ozone. Such conventional bleaching sequences are able to delignify and decolorize the brown fiber. However, such delignification and decolorization processes involve high capital and operating costs. The other fibers present in the pulp (those which were previously subjected to bleaching before recycling) are also subjected to this harsh bleaching sequence and are also weakened and partially dissolved. The result is a substantial yield loss.

Office waste often contains substantial quantities of paper made from groundwood fiber (i.e., mechanically pulped softwoods typically used in making newsprint and some computer printout, book and magazine grade papers). Mechanical pulping typically does not result in delignification of the pulp, and the lignin content of office waste can therefore often be similar to that of unbleached hardwood pulp, with a Kappa Number (a measure of the lignin content in a pulp) of about 10 to 15. A conventional multistage bleach sequence could be used to bleach pulp from such office waste and decolorize the brown fibers. However, such a process would require a large, expensive bleaching plant involving a high chemical cost and would result in a high yield loss (about 5% for a Kappa 10-15 pulp) and a large effluent stream.

It would therefore be desirable to provide a method for decolorizing the brown fiber in office waste (and similar waste paper sources such as "junk mail" collected from households) without the disadvantages of the conventional bleaching technology. Ideally, such a method should be non-delignifying and result in low yield losses, and use relatively mild non-chlorine bleaching agents to reduce chemical handling hazards and effluent concerns.

Accordingly, is an object of the present invention to provide a process for effective decolorizing of brown fibers in recycled pulp, such that unsorted waste paper containing some unbleached fiber, including difficult to bleach kraft fiber, may be satisfactorily used for producing decolorized pulp useful for producing printing and writing grade paper.

It is another object of the invention to provide a process for effective bleaching of dyed fiber present in low grade waste paper such as office waste.

SUMMARY OF THE INVENTION

The present invention is directed to a method for decolorizing paper pulp containing colored fibers. The paper is first pulped and subjected to fine screening. The screened pulp is then dispersed at a temperature in excess of 100° C. and a pressure exceeding one atmosphere absolute pressure. Prior to the dispersing step a first agent (a reducing agent or oxidizing agent) is introduced to the pulp. A second agent is introduced to said pulp after introduction of the first agent. The second agent is an oxidizing agent when the first agent is a reducing agent, and a reducing agent when the first agent is an oxidizing agent. Finally, the dispersed pulp is recovered after the colored fibers are decolorized.

BRIEF DESCRIPTION OF THE DRAWINGS

FIG. 1 is a flow diagram depicting the major process steps involved in the method of the present invention.

DETAILED DESCRIPTION OF THE INVENTION

The present inventors have discovered that treatment of recycled pulp with both an oxidative and a reductive treatment is particularly effective for decolorizing brown fibers, including even difficult to bleach brown kraft fiber. Without being bound by theory, it appears that when the lignin and other color bodies found in the pulp are reacted with a reducing agent, they become more susceptible to reaction with an oxidizing agent, resulting in excellent decolorizing results. The converse is also true: the pulp may be treated first with an oxidizing agent which makes the lignin and color bodies more susceptible to reaction with a reducing agent. Neither the reducing agent nor the oxidizing agent removes lignin from the pulp to any great extent. Accordingly, the process results in decolorization without significant delignification and without noticeable yield loss. For simplicity, as discussed herein, the process is generally described as a reduction/oxidation process, but it is to be understood that this description also encompasses oxidation/reduction processes.

The overall decolorizing process is described with reference to FIG. 1, which depicts a flow diagram of the various process steps. First, the recycled paper is introduced to a hydrapulper 2 or similar pulping device for pulping the paper. The pulp is then subjected to detrashing 4 to remove wire and plastic and other heavy contaminants. The pulp is then transferred to a dump chest 6 and subsequently subjected to coarse screening 8. After coarse screening, the pulp undergoes a fine screening 10 process and subsequent centrifugal cleaning step 12. The pulp is then thickened 14 to an appropriate consistency and subjected to high temperature, pressurized dispersion 16 in the presence of an oxidizing or reducing agent as described in greater detail below. After the dispersion step, the pulp is then bleached, preferably in a bleaching tower 18. The bleaching agent is an oxidizing agent (if a reducing agent was used in dispersion) or a reducing agent (if an oxidizing agent was used in dispersion). Finally, the decolorized, deinked pulp is stored 20 for subsequent processing.

The conditions for carrying out the reduction/oxidation steps are an important aspect of the invention. It is necessary that either or both of the reduction and oxidation processes take place in conjunction with treatment of the pulp under high temperature and pressure, preferably in a heated, pressurized pulp disperser.

A pulp disperser is typically used in a recycling plant to treat the pulp to reduce the size of ink and contaminant particles. The disperser may include high speed disc dispersers and other types of kneading devices. Generally, the pulp dispersion step does not require high pressure. However, with the present invention it is necessary that at least one stage of the reduction/oxidation process take place under pressure higher than atmospheric pressure and at a temperature at or higher than about 100° C. Without intending to be bound by theory, it is believed that treatment at high temperature and pressure results in enhanced mechanical rubbing action in the disperser which may open up the brown kraft fibers for better chemical penetration, and may force the chemical into the center of the fibers. The elevated pressure may also increase the penetration of reactants into the center of the fibers including the difficult to bleach brown kraft fibers. High temperature probably aids in softening the relatively stiff brown fibers, thereby increasing the effectiveness of the mechanical treatment. The high temperature may also result in certain chemical reactions taking place between the reducing or oxidizing agent and the color bodies which do not occur at lower temperatures.

Generally, the pulp introduced to the pulp disperser may have a consistency of between about 10 and 40 percent by weight of pulp in the mixture of pulp and water, but it is preferred that the consistency be between about 25 and 35%. Pulp consistency in this range is desirable because it provides an optimum rubbing action on the fibers. Temperatures employed in the pulp disperser may be between about 100° C. and 130° C., and are preferably between 105° C. and 120° C. Pressures in the disperser may be between about 5 psi and 30 psi, and are preferably between 5 and 20 psi. Generally, increasing the temperature (and accordingly, pressure) in the disperser will improve the decolorization process. However, temperatures greater than about 125° C. will excessively damage the fibers.

The reducing agent (or oxidizing agent) may be introduced in the pressurized pulp disperser or upstream of the disperser as long as the pulp is subjected to high pressure and temperature in the presence of the reducing agent (or oxidizing agent). The other stage (oxidizing or reducing) may take place within the same or a separate pressurized disperser or a non-pressurized disperser, or in some other type of mixing device, including without limitation, a medium consistency mixer or a medium consistency pump. It is preferred to introduce the reducing agent or oxidizing agent to the pressurized disperser by adding it into a plug screw feeder which feeds the pulp into a steam heating tube ahead of the disperser.

The reducing step and oxidation step may each be carried out in sequential stages at various points throughout the process. In addition, multiple reducing steps and/or multiple oxidizing steps may be carried out, with the same or different reagents. Optionally, the pulp may be washed with a water rinse, before or after any of the oxidizing or reducing steps. A retention tower may be used to complete the reaction of the oxidizing or reducing agent following treatment in the pressurized disperser or the non-pressurized disperser or following any other mixing step which may be used.

It is preferred that formamidine sulfinic acid (FAS) (also known as thiourea dioxide) be used as the reducing agent in the present invention. Other suitable reducing agents include, but are not limited to, sodium hydrosulfite and sodium borohydride. Mixtures of reducing agents may be used.

The preferred oxidizing agent is hydrogen peroxide. Other suitable oxidizing agents include oxygen, persulfates, such as potassium peroxymonosulfate and potassium persulfate and sodium persulfate, peracids such as peracetic acid, peroxymonosulfuric acid (Caro's Acid), PXA (mixed peracids, such as a mixture of glacial acetic acid, concentrated sulfuric acid and hydrogen peroxide), and other peroxy compounds. Mixtures of oxidizing agents may be used. The peroxide or other oxidizing agent may be introduced to the pulp at any suitable point during the decolorizing process, including the hydrapulper, a pump suction, or into any type of mixing device including a disperser or kneader. In a preferred embodiment, hydrogen peroxide is introduced at two stages of the process; first in the hydrapulper, and subsequently after the disperser. FAS is the preferred reducing agent and is introduced immediately before the disperser.

Adjuvants may be employed to enhance the decolorizing action or to lower the required dosage of the oxidizing or reducing agents. Such adjuvants include without limitation, chelating agents, protective agents such as sodium silicate and magnesium salts, catalysts, and other additives.

The present inventors have also discovered that it is necessary to subject the pulp to prescreening using a fine slotted screen prior to introduction of the pulp to the pressurized disperser. The fine slotted prescreening rejects large brown fibers which might not be fully decolorized by the reduction/oxidation process described herein, under typical processing conditions. Generally, the slots should be no wider than about 0.010" and preferably between about 0.004" and 0.008" in width. After the prescreening step, any brown fibers present in the pulp will be of a relatively uniform, small size. Thus, the reaction conditions may be selected to be only as harsh as necessary to decolorize the uniform brown fibers present after fine slotted prescreening.

In one embodiment, the prescreening process employs a multistage pressurized screening using a primary screen with a slotted screen with slots no more than about 0.010" in width. Accepts from the primary screen proceed to further processing. Rejects from the primary screen are subjected to a secondary screen also having slots no more than about 0.010" in width. Accepts from the secondary screen proceed to further processing. Rejects from the secondary screen are subjected to a tertiary and final screen also having slots no more than about 0.010" in width. The tertiary rejects are discarded. Tertiary accepts proceed to further processing. The pressure screens typically operate with a feed pressure of at least 10 psi. The prescreening process removes large (and/or stiff) brown fibers and shives from the pulp. Shives are two or more brown fibers joined together to form a fiber bundle of greater width and stiffness than an individual fiber.

It is desirable but not necessary to include one or more ink removal steps at some stage in the recycling process.

The following examples are included to illustrate the present invention without limitation.

EXAMPLE 1

Office waste paper contaminated with about 0.3% brown unbleached fiber from corrugated boxes was repulped in a process including a continuous deinking system and a prescreening stage, and a batch pulping stage. The batch pulping stage pulped 10 tons of paper per batch. The prescreening stage included a three stage pressure screening system having slots of 0.006" width. Each screen employed an in-feed pressure of about 25 psi and the pulp consistency was about 1.5%. The flow rate was 12.5 tons/hour, dry fiber weight. The primary screen accepts went forward in the system to further processing. The rejects stream from the first (primary) screen was processed in a secondary screen also having 0.006" slots, and the rejects from the secondary screen were processed through a tertiary screen also having 0.006" slots. The tertiary rejects were discarded. Handsheets were produced from the feed stream to the primary screen, the accepts stream from the primary screen, and the rejects stream from the tertiary screen. Handsheets weighing two grams were made by filtering the pulp slurry onto a 6" diameter filter paper and drying the sheet. The number of brown fibers and shives were counted in the handsheets, and the counts were expressed per square meter of paper surface. The results are shown in the following Table 1:

TABLE 1

|  | Brown Shives/m$^2$ | Brown Fibers/m$^2$ |
| --- | --- | --- |
| Primary Feed | 110 | 370 |
| Primary Accepts | 14 | 219 |
| Tertiary Rejects | 767 | 1425 |

Comparison of the primary feed and accepts shows that on these samples 87% of the shives and 41% of the individual brown fibers were removed by the primary slotted screen. These fine slotted screens separate according to particle width and particle stiffness, and therefore are particularly effective at removing shives. Therefore, the primary accepts still contained a large number of individual brown fibers, but most of the shives were removed by the primary screen. The shives present in the primary accepts stream were generally smaller than the shives removed by the primary screen.

After passage through the primary screen, the primary accepts then passed through a centrifugal cleaner system having 3" diameter reverse cleaners followed by 6" diameter forward cleaners followed by 2.5" diameter forward cleaners. The centrifugal cleaners were obtained from Celleco Hedemora, Inc., Lawrenceville, Ga. The centrifugal cleaners removed both heavyweight (specific gravity>1) and lightweight (specific gravity<1) contaminants, but did not remove any brown fibers. The cleaned pulp was thickened from 0.5% consistency to 25% consistency on a pulp decker (from Andritz Sprout-Bauer, Inc., Atlanta, Ga.) followed by a pulp screw press (from Cellwood Machinery AB, Nassjo, Sweden) and then introduced to a pressurized disc disperser (from Cellwood Machinery AB, Nassjo, Sweden) operating at 1250 rpm and equipped with toothed plates where it was treated with a dosage of 0.5% FAS (obtained from Dastech International, Inc., Great Neck, N.Y.) and 0.25% sodium hydroxide, and the pulp heated to 239° F. (15 psig pressure) at 25% pulp consistency. These chemicals were added to the pulp prior to a plug screw feeder which fed the pulp into a pressurized steam mixing tube. The disperser gap was set at 0.5 mm to avoid any pulp refining which might occur at closer gaps, and which might subsequently adversely affect pulp drainage on the paper machine. After emerging from the disperser the dispersed pulp was then bleached with 1.0% hydrogen peroxide at 185° F. for 60 minutes in a bleach tower at 10% pulp consistency at pH 10 with 1.0% sodium silicate and 0.1% DTPA (diethylenetriaminepentaacetic acid) obtained from Dow Chemical USA, Midland, Mich. The chemicals were all added to the pulp stream just prior to a high intensity mixer which preceded the bleach tower. The sodium silicate and DTPA act to protect the hydrogen peroxide from decomposition. The effect on shives and brown fibers in the pulp was measured by preparing handsheets as described above. The results are set forth in Table 2 below:

TABLE 2

|  | Brown Shives/m$^2$ | Brown Fibers/m$^2$ |
| --- | --- | --- |
| Pre disperser | 14 | 219 |
| After disperser | 0 | 27 |
| After peroxide | 0 | 0 |

It can be seen that the pressurized dispersion with FAS treatment was completely effective in breaking down and decolorizing the remaining small shives and 88% effective in decolorizing the individual brown fibers. The subsequent oxidative treatment with peroxide was completely effective in decolorizing the remaining semibleached and dispersed brown fibers. Thus, the prescreening step was able to remove the largest shives and brown fibers, so that the pressurized dispersion-FAS treatment followed by peroxide was able to penetrate and uniformly bleach all the remaining brown shives and fibers on which the slotted screens were ineffective.

EXAMPLE 2

Office waste containing brown unbleached fiber was processed through the 0.006" slotted screening system described above, followed by the centrifugal cleaning step also described above. The pulp was thickened to 25% consistency using a pulp decker and a screw press and dispersed with 0.4% FAS and 0.2% sodium hydroxide dosage. The disperser gap was 0.55 mm. Two tests were run, first at 205° F. (zero pressure) and then at 240° F. (15 psig pressure). Pulp samples were collected immediately pre-disperser and post-disperser and handsheets prepared. The results of shive and brown fiber analysis are set forth below in Table 3:

TABLE 3

|  | Brown Shives/m² | Brown Fibers/m² |
| --- | --- | --- |
| Pre-disperser | 55 | 863 |
| Post-disperser (205° F.) | 0 | 712 |
| Post-disperser (240° F.) | 0 | 27 |

At 205° F. the brown fiber decolorization was relatively poor (17%), although the brown fibers were partially bleached and were lighter than their original color. However, the elimination of shives was complete at this temperature. With pressurized, high temperature dispersion, the brown fiber elimination was 97%. This shows the effect of pressure and high temperature on obtaining complete chemical penetration and bleaching of the brown fibers. These results also show that satisfactory results may be obtained at 240° F. when lower amounts of FAS (0.4%) and sodium hydroxide (0.2%) were employed.

EXAMPLE 3

Office waste containing about 0.5% of brown unbleached fiber mixed with white and colored fiber was processed through a deinking system having coarse screening followed by fine screening, where the fine screens had a slot width of 0.006". After screening and prior to dispersion, the pulp was thickened to about 25% consistency. The thickened pulp was then heated to a temperature of 239° F. and a pressure of 15 psig and dispersed with a dosage of 0.5% FAS and 0.25% NaOH added to the pulp. The gap between the plates of the disperser was set at 1.0 mm. The brown fiber content of the thickened pulp was measured both pre- and post-disperser, and was expressed as the total count of brown shives and individual brown fibers per square meter of paper surface. Four different sets of samples were collected at different times. The results are set forth below in Table 4:

TABLE 4

| | Brown Fiber Content | | |
| --- | --- | --- | --- |
|  | Before Dispersion Brown Shives/m² | After Dispersion Brown Fibers/m² | % Reduction |
| Test 1 | 5800 | 110 | 98 |
| Test 2 | 3100 | 60 | 98 |
| Test 3 | 5300 | 270 | 95 |
| Test 4 | 7000 | 270 | 96 |
| Average | 5300 | 178 | 97 |

If the prescreening step is omitted, it will not be possible to successfully bleach all of the brown fibers. The resultant pulp will have an unacceptably non-uniform appearance and low brightness. Conversely, if the prescreened pulp passes through the pressurized disperser without FAS, there will be no bleaching of the brown fibers not removed by prescreening.

The amount of FAS and peroxide may be increased to increase brightness up to a maximum of about 0.5% FAS and 1.5% $H_2O_2$ in a single stage. However, the preferred amount of FAS is 0.3–0.4% in most cases.

What is claimed is:

1. A method for decolorizing paper pulp, comprising:
   pulping paper containing colored fibers;
   subjecting the pulped paper to fine screening;
   dispersing the screened pulp at a temperature in excess of 100° C. and a pressure exceeding one atmosphere absolute pressure; and
   introducing to said pulp prior to said dispersing step a first agent selected from the group consisting of reducing agents and oxidizing agents and introducing a second agent to said pulp after introduction of said first agent, said second agent being an oxidizing agent when said first agent is a reducing agent, and being a reducing agent when said first agent is an oxidizing agent;
   whereby said colored fibers are decolorized.

2. The method of claim 1 wherein the reducing agent is selected from the group consisting of formamidine sulfinic acid, sodium hydrosulfite, sodium borohydride and mixtures thereof.

3. The method of claim 2 wherein the reducing agent is formamidine sulfinic acid.

4. The method of claim 3 wherein the amount of formamidine sulfinic acid introduced is between about 0.2 and 0.5 percent by weight of the pulp.

5. The method of claim 1 wherein the oxidizing agent is selected from the group consisting of hydrogen peroxide, oxygen, persulfates, peracids, ozone and mixtures thereof.

6. The method of claim 5 wherein the oxidizing agent is hydrogen peroxide.

7. The method of claim 6 wherein the amount of hydrogen peroxide introduced is between about 0.5 and 1.5 percent by weight of the pulp.

8. The method of claim 1 wherein the colored fibers are brown fibers.

9. The method of claim 1 wherein said pressure is between about 5 and 30 psi above one atmosphere absolute pressure.

10. The method of claim 1 wherein the dispersing of the pulp is conducted in a pressurized disperser.

11. The method of claim 10 wherein the pulp treated in the pressurized disperser has a consistency of between about 10 and 40%.

12. The method of claim 11 wherein the consistency of the pulp is between about 25 and 35%.

13. The method of claim 1 wherein said temperature is between about 100° C. and 130° C.

14. The method of claim 1 wherein said fine screening step employs a slotted screen having a slot width no wider than about 0.010 inches.

15. The method of claim 14 wherein the slotted screen has a slot width of between 0.004 and 0.008 inches.

16. The method of claim 1 further comprising subjecting said pulp to deinking, when said paper is printed with ink.

17. The method of claim 1 further comprising subjecting the prescreened pulp to centrifugal cleaning.

18. The method of claim 1 wherein the pulp is washed with water prior to the introduction of said second agent.

19. The method of claim 1 further comprising introducing a chelating agent to the pulp.

20. The method of claim 19 wherein said chelating agent is diethylenetriaminepentaacetic acid.

21. The method of claim 1 wherein said colored fibers include shives.

22. The method of claim 1 wherein said first agent is introduced to said pulp during said pulping step.

23. The method of claim 22 wherein said second agent is introduced to said pulp prior to said dispersing step.

24. The method of claim 23 wherein said first agent is hydrogen peroxide and said second agent is formamidine sulfinic acid.

25. The method of claim 24 further comprising introducing additional hydrogen peroxide to said dispersed pulp.

26. A method for decolorizing paper pulp, comprising:

pulping paper containing colored fibers;

subjecting the pulped paper to free screening;

introducing to the screened pulp formamidine sulfinic acid;

dispersing the pulp containing said formamidine sulfinic acid at a temperature between about 100° C. and 130° C. and a pressure exceeding one atmosphere absolute pressure;

introducing hydrogen peroxide to the pulp; and subjecting the pulp containing said hydrogen peroxide to mixing and retention until said colored fibers are decolorized.

27. A method for decolorizing paper pulp, comprising:

pulping paper containing colored fibers;

subjecting the pulped paper to fine screening;

introducing to the screened pulp a first agent selected from the group consisting of reducing agents and oxidizing agents;

dispersing the pulp containing said first agent at a temperature in excess of 100° C. and a pressure exceeding one atmosphere absolute pressure;

introducing a second agent to the pulp, said second agent being a oxidizing agent when said first agent is a reducing agent, and being a reducing agent when said first agent is an oxidizing agent; and subjecting the pulp containing said second agent to mixing and retention until said colored fibers are decolorized.

* * * * *

UNITED STATES PATENT AND TRADEMARK OFFICE
CERTIFICATE OF CORRECTION

PATENT NO. : 5,733,412
DATED : March 31, 1998
INVENTOR(S) : Larry D. MARKHAM et al.

It is certified that error appears in the above-indentified patent and that said Letters Patent is hereby corrected as shown below:

Column 8 (claim 1), line 8, please delete "exoooding" and substitute therefor -- exceeding --.

Signed and Sealed this

Fourth Day of August, 1998

Attest:

BRUCE LEHMAN

Attesting Officer

Commissioner of Patents and Trademarks